United States Patent
Ng et al.

(10) Patent No.: US 7,234,169 B2
(45) Date of Patent: *Jun. 19, 2007

(54) METHOD AND APPARATUS FOR INTEGRATING AND MONITORING KEY DIGITAL CINEMA SYSTEM COMPONENTS AS A MEANS TO VERIFY SYSTEM INTEGRITY

(75) Inventors: Joseph S. Ng, Montebello, CA (US); Ismael Rodriguez, El Segundo, CA (US); Antonie C. Smith, Centurion (ZA)

(73) Assignee: The Boeing Company, Chicago, IL (US)

( * ) Notice: Subject to any disclaimer, the term of this patent is extended or adjusted under 35 U.S.C. 154(b) by 918 days.

This patent is subject to a terminal disclaimer.

(21) Appl. No.: 10/191,346

(22) Filed: Jul. 8, 2002

(65) Prior Publication Data

US 2003/0204750 A1 Oct. 30, 2003

Related U.S. Application Data

(60) Provisional application No. 60/376,244, filed on Apr. 29, 2002, provisional application No. 60/376,242, filed on Apr. 29, 2002, provisional application No. 60/376,105, filed on Apr. 29, 2002.

(51) Int. Cl.
*H04K 1/00* (2006.01)
*G06F 11/00* (2006.01)

(52) U.S. Cl. .................. 726/34; 726/35; 713/189; 713/194; 380/258; 709/224

(58) Field of Classification Search ............... 713/193; 380/211
See application file for complete search history.

(56) References Cited

U.S. PATENT DOCUMENTS 5,509,073 A * 4/1996 Monnin ................ 380/229

OTHER PUBLICATIONS

D. Kirovski, M. Peinado, F.A.P. Petitcolas: "Digital Rights Management for Digital Cinema", Inter. Symp. on Optical Science & Tech.—Security in Imaging: Theory & Applications, San Diego, CA, Jul. 2001.*
National Association of Theatre Owners; "Digital Cinema User Requirements", Feb. 22, 2002.*
"Data Transport and Processing in a Digital Cinema Theatre System", by Hose, Winchell, Walker and Ratzel; Qualcomm Incorporated from the 36th Advanced Motion Imaging Conference dated Feb. 7-9, 2002.*
Steven A. Morley, (1998) "Making Digital Cinema Actually Happen—What It Takes and Who's Going to Do It", QUALCOMM, Inc., pp. 1-17.

* cited by examiner

*Primary Examiner*—Gilberto Barron
*Assistant Examiner*—A. Nobahar
(74) *Attorney, Agent, or Firm*—Gates & Cooper LLP

(57) ABSTRACT

One or more embodiments of the invention provide a method, apparatus, system, and article of manufacture for monitoring components of a digital cinema system. A digital cinema system utilizes an exhibitor system (that has one or more components) to display media content. A configuration of the exhibitor system is stored in the exhibitor system. The integrity of the configuration is then determined by querying each of the components. Software agents on each of the components respond to the query. Based on the configuration and the responses received, the integrity of the exhibitor system is determined.

28 Claims, 4 Drawing Sheets

METHOD AND APPARATUS FOR INTEGRATING AND MONITORING KEY DIGITAL CINEMA SYSTEM COMPONENTS AS A MEANS TO VERIFY SYSTEM INTEGRITY

CROSS-REFERENCE TO RELATED APPLICATIONS

This application claims the benefit under 35 U.S.C. Section 119(e) of the following co-pending and commonly-assigned U.S. provisional patent applications, which are incorporated by reference herein:

Provisional Application Ser. No. 60/376,242, filed Apr. 29, 2002, by Joseph S. Ng, Ismael Rodriguez, and Anton Smith, entitled "A METHOD TO INTEGRATE AND MONITOR KEY COMPONENTS AS A MEANS TO VERIFY SYSTEM INTEGRITY,"

Provisional Application Ser. No. 60/376,105, filed Apr. 29, 2002, by Charles F. Stirling, Bernard M. Gudaitis, William G. Connelly and Catherine C. Girardey, entitled "SECURE DATA CONTENT DELIVERY SYSTEM FOR MULTIMEDIA APPLICATIONS UTILIZING BANDWIDTH EFFICIENT MODULATION,"; and Provisional Application Ser. No. 60/376,244, filed Apr. 29, 2002, by Ismael Rodriguez and James C. Campanella, entitled "A METHOD TO SECURELY DISTRIBUTE LARGE DIGITAL VIDEO/DATA FILES WITH OPTIMUM SECURITY,".

This application is related to the following co-pending and commonly-assigned patent application, which application is incorporated by reference herein:

U.S. patent application Ser. No. 10/190,908, filed on the same date herewith, entitled "METHOD FOR SIGNALLING TAMPERING OF REMOTELY POSITIONED COMPONENTS BY TAGGING AND GLOBAL POSITIONING SYSTEM MONITORING", by Joseph S. Ng and Ismael Rodriguez.

BACKGROUND OF THE INVENTION

1. Field of the Invention

The present invention relates generally to digital cinema systems, and in particular, to a method, apparatus, and article of manufacture for protecting the intellectual property rights and integrity of components of the use management of a digital cinema system.

2. Description of the Related Art

The methods by which movies and other media programs that are distributed to theaters for display to audiences have not substantially changed in over 75 years. Celluloid copies of such movies are distributed to each theater in advance of the first showing, and the same copy is repeatedly displayed for audiences until the movie is excessively worn, the license expires, or the theater stops showing the movie in favor of a more popular movie.

There are several problems with this process. First, the process of manually and securely distributing physical celluloid copies of each movie is costly. Second, it is time consuming. This is especially important in circumstances where last minute changes must be made to the film before release. Such time concerns often prohibit that any such changes be made.

There is therefore a need for a method and system for distributing media programs in a rapid and inexpensive manner. As will be described further herein, the present invention solves that need by providing for the distribution of digital copies of media programs via a satellite or other high bandwidth medium. For example, digital cinema systems provide the ability for distributing digital copies of motion picture "films" electronically directly to theatres running exhibitor systems.

However, the use of digital cinema systems presents additional challenges. For example, because of the ability to identically duplicate digital content, significant concerns exist regarding the intellectual property (IP) rights of content. In addition to content security, components of both distribution centers and exhibitor systems are fairly expensive. Accordingly, currently, there are very few digital cinema exhibitor installations in the world. As digital cinema systems are deployed on a large scale, owners and theatres may desire to protect and prevent the unauthorized removal, replacement, resale, or reuse of the exhibitor system components.

For example, if a component from one exhibitor system is removed and installed into another exhibitor system, a potential exists that the characteristics or capability of the exhibitor system may change. This may result in allowing the exhibitor system to operate outside of the intent of use management. Thus, if a larger digital projector was installed replacing a smaller digital projector, the exhibitor system may be able to be used for a larger screen, where the use management permits authorized uses in small screen only.

The prior art mechanism for ensuring content security and integrity is physical human security and supervision. Such human supervision is limiting and not efficient or useful when launching a significant deployment of a digital cinema system.

What is needed is a system and method for the distribution of digital media that protects the content owner's intellectual property rights and the integrity of the use management of an exhibitor system. The present invention satisfies these needs.

SUMMARY OF THE INVENTION

One or more embodiments of the invention ensures the configuration integrity of an exhibitor system and protects the content intellectual property use management. The configuration of an exhibitor system is stored in a local member component database on the exhibitor system. Each time the exhibitor system is turned on or at any desirable time, each of the components in the exhibitor system is queried by an integrity validation mechanism/method. Software agents on each of the components respond to the query with a permanent identification (of the component itself). The responses are compared to the local member component database to determine if any discrepancies exists (e.g., if any new components have been added or if a component is missing).

If the validation mechanism determines that a discrepancy exists, the integrity of the configuration may be compromised. Accordingly, an error message may be displayed locally (i.e., at the exhibitor system) and/or forwarded and displayed at a network operation center. Further, both an old version of the local member component database and the new version (i.e., the version containing the discrepancy) may be forwarded to a network operation center (NOC) for validation. The NOC may then execute an independent verification by comparing the member component database(s) with a master member component database stored at the NOC. Additionally, the NOC may maintain information regarding the authorized configuration of the exhibitor system and may validate the updated version of the database based on this maintained information.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide for the use of mutual authentication of key components in an exhibitor system to verify system integrity. Based on the verification, a content owner's intellectual property rights may be protected and the integrity of the use management of an exhibitor system may be preserved.

Hardware Environment

Figure 1A:
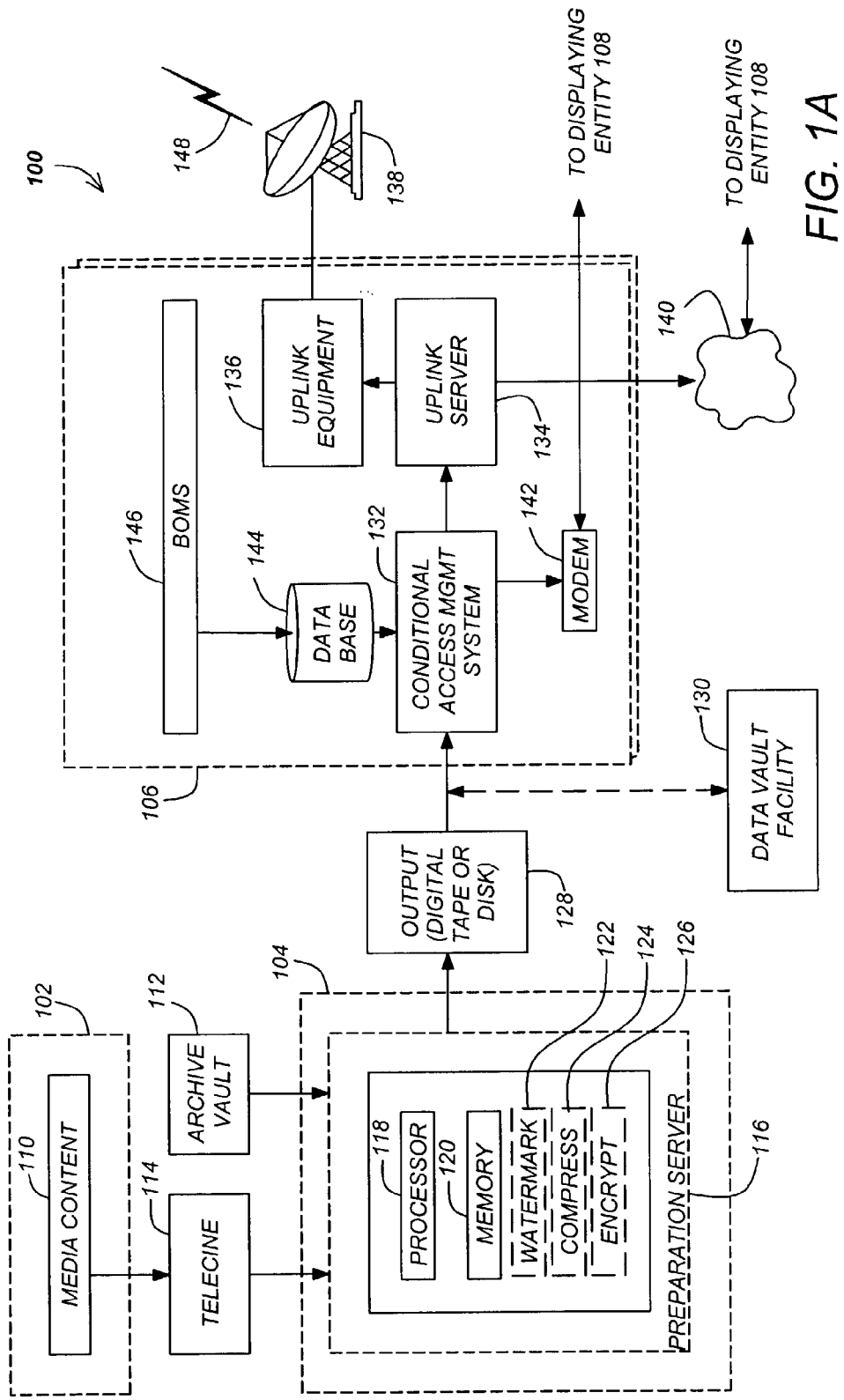
FIGS. 1A and 1B depict a top-level functional block diagram of one embodiment of a media program distribution system in accordance with one or more embodiments of the invention.
Figure 1B:
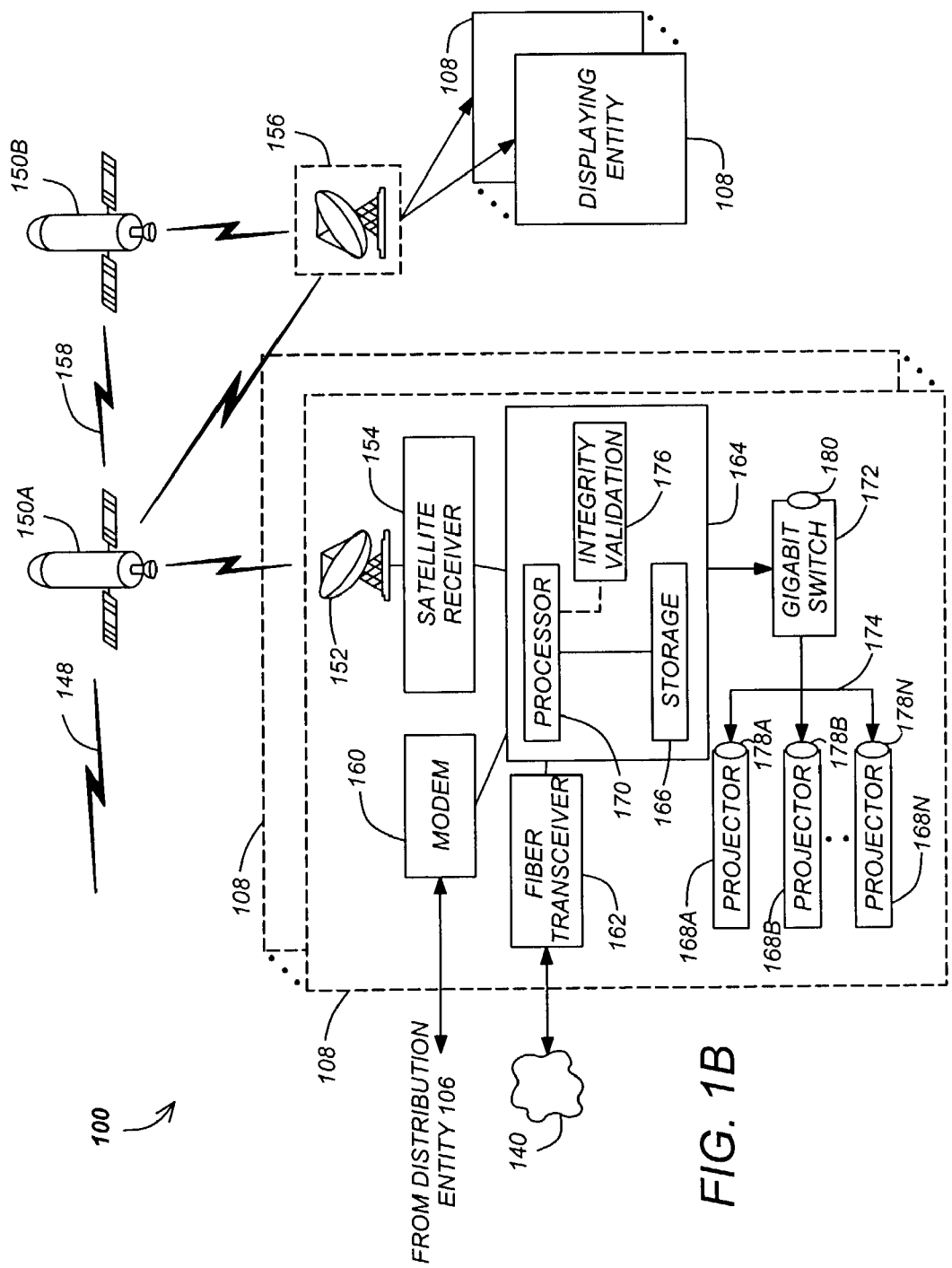

FIGS. 1A and 1B depict a top-level functional block diagram of one embodiment of a media program distribution system 100. The media distribution system 100 comprises a content provider 102, a protection entity 104, a distribution entity 106 and one or more presentation/displaying entities 108. The content provider 102 provides media content 110 such as audiovisual material to the protection entity 104. The media content 110, which can be in digital or analog form, can be transmitted in electronic form via the Internet, by dedicated land line, broadcast, or by physical delivery of a physical embodiment of the media (e.g. a celluloid film strip, optical or magnetic disk/tape). Content can also be provided to the protection entity 104 (also referred to as a preparation entity) from a secure archive facility 112.

The media content 110 may be telecined by processor 114 to format the media program as desired. The telecine process can take place at the content provider 102, the protection entity 104, or a third party.

The protection entity 104 may include a media preparation processor 116. In one embodiment, the media preparation processor 116 includes a computer system such as a server, having a processor 118 and a memory 120 communicatively coupled thereto. The protection entity 104 further prepares the media content 110. Such preparation may include adding protection to the media content 110 to prevent piracy of the media content 110. For example, the preparation processor 116 can add watermarking 122 and/or encrypt 126 the media content 110 to protect it. In addition, the preparation processor can also apply compression 124 to the media content 110. Once prepared, the output media content 128 can be transferred to digital tape or a disk (e.g. a DVD, laserdisk, or similar medium). The output media content 128 can then be archived in a data vault facility 130 until it is needed.

When needed, the prepared output media content 128 is then provided to the distribution entity 106 (alternatively referred to hereinafter as the network operations center [NOC]). Although illustrated as separate entities, the protection entity 104 and the distribution entity 106 can be combined into a single entity, thus ameliorating some security concerns regarding the transmission of the output media content 128.

The distribution entity 106 includes a conditional access management system (CAMS) 132 (also referred to as a configuration management engine), that accepts the output media content 128, and determines whether access permissions are appropriate for the content 128. Further, CAMS 132 may be responsible for additional encrypting so that unauthorized access during transmission is prevented. Once the data is in the appropriate format and access permissions have been validated, CAMS 132 provides the output media content 128 to an uplink server 134, ultimately for transmission by uplink equipment 136 to one or more displaying entities 108 (also referred to as exhibitor systems) (shown in FIG. 1B). This is accomplished by the uplink equipment 136, and uplink antenna 138. Also, as shown, in addition to or in the alternative to transmission via satellite, the media program can be provided to the displaying entity 108 via a forward channel fiber network 140. Additionally, information may be transmitted to displaying entity 108 via a modem 142 using, for example a public switched telephone network line. A land based communication such as through fiber network 140 or modem 142 is referred to as a back channel. Thus, information can be transmitted to and from the displaying entity 108 via the back channel or the satellite network. Typically, the back channel provides data communication for administration functions (e.g. billing, authorization, usage tracking, etc.), while the satellite network provides for transfer of the output media content 128 to the displaying entities 108.

The output media content 128 may be securely stored in a database 144 (also referred to as a master database 144). Additionally, information regarding displaying entity 106 may be stored in master database 144. Such information may include configuration information regarding components of distribution entity 106. In this regard, strong authentication (such as a smart card) may be required to control read/write access to the master database 144. Data is transferred to and from the master database 144 under the control and management of the business operations management system (BOMS) 146. Thus, the BOMS 146 manages the transmission of information to 108, and assures that unauthorized transmissions do not take place.

Turning to FIG. 1B, the data transmitted via uplink 148 is received in a satellite 150A, and transmitted to a downlink antenna 152, which is communicatively coupled to one or more satellites or downlink receivers 154.

In one embodiment, the satellite 150A also transmits the data to an alternate distribution entity 156 and/or to another satellite 150B via crosslink 158. Typically, satellite 150B services a different terrestrial region than satellite 150A, and transmits data to displaying entities 108 in other geographical locations.

Figure 2:
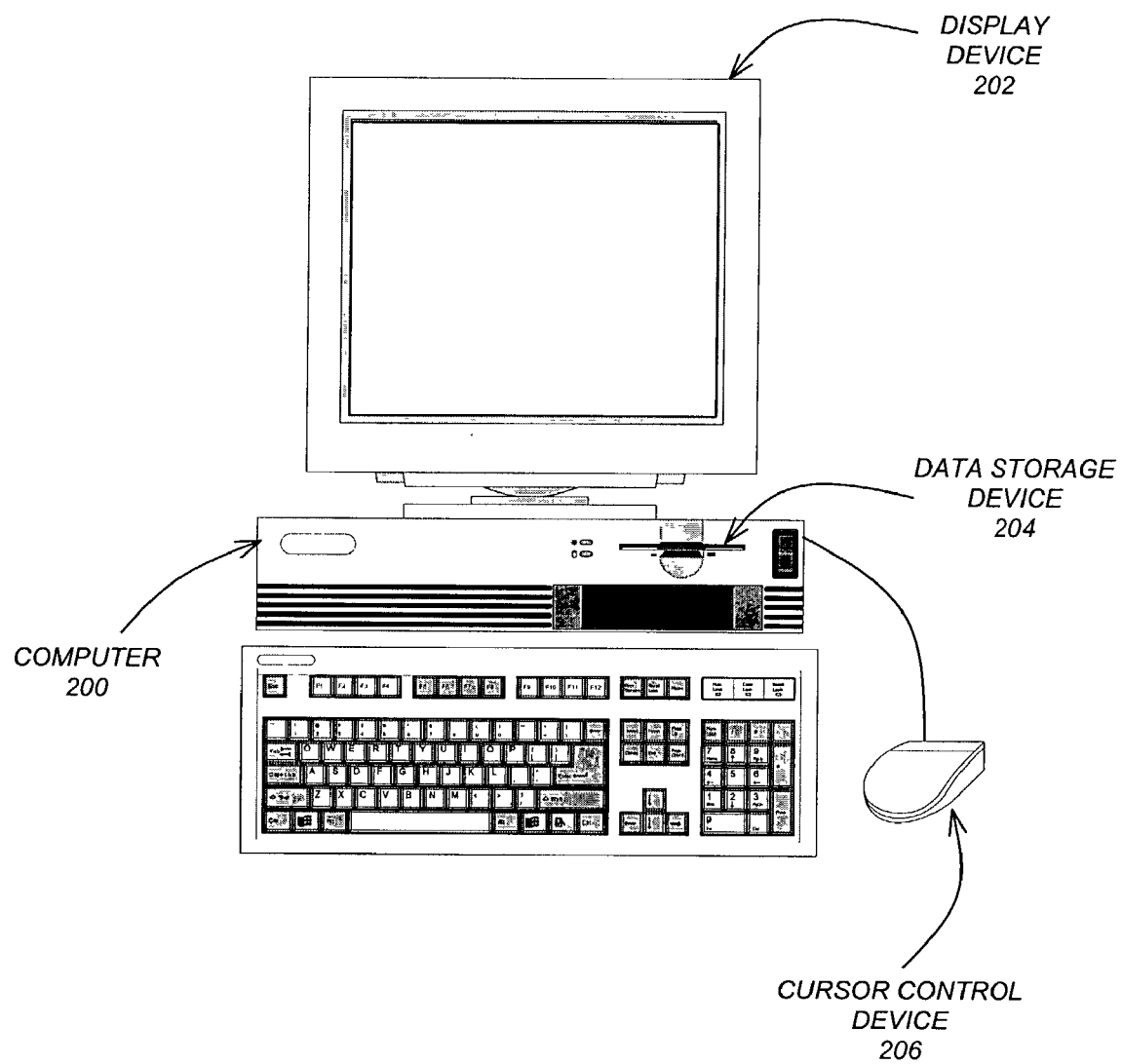
FIG. 2 is a functional block diagram of a computer system that can be used to perform the operations of a media preparation processor and processing system in accordance with one or more embodiments of the invention.

A typical displaying entity 108 comprises a modem 160 (and may also include a fiber transceiver 162) for receiving and transmitting information through the back channel (i.e., via a communication path other than that provided by the satellite system described above) to and from the distribution entity 106. For example, feedback information (e.g. relating to system diagnostics, billing, usage and other administrative functions) from the exhibitor 108 can be transmitted through the back channel to the distribution entity 106. The output media content 128 and other information may be accepted into a processing system 164 (also referred to as a content server or admin server) such as a server or computer similar to that which is illustrated in FIG. 2 (see description below). The output media content 128 may then be stored in the storage device 166 (and/or one or more file servers) for later transmission to displaying systems (e.g., digital projectors) 168A–168N through gigabit switch 172 and gigabit Ethernet 174. Before storage, the output media content 128 can be decrypted to remove transmission encryption (e.g. any encryption applied by the CAMS 132), leaving the encryption applied by the preparation processor 116.

When the displaying entity 108 is set up, the configuration of the displaying entity 108 (i.e., the identification and placement/use management of components of local displaying entity 108) is established. In addition to storing media content 110 in storage 166, the established configuration of displaying entity 108 may be stored therein. In this regard, strong authentication (e.g., a smart card) may be required to control read/write access to the local database storage 166. This stored configuration information may also be referred to and stored in a member component database. The member component database identifies all member components of this specific displaying entity 108 including spare components. Such an identification may include a permanent identification of each member component (including spare components). In this regard, each component may be identified by a unique permanent identification. Such an identification may be an unalterable identification that is one-time programmed during the manufacture of the component. Thus, the member component database/configuration is stored in nonvolatile memory at the local displaying entity 108.

A copy of the member component database is forwarded to the master database 144 at the distribution entity 106. Such a forwarding/communication of the member component database may occur when the displaying entity 108 is setup, each time the displaying entity 108 is turned on, and/or each time the configuration of displaying entity 108 is modified. The distribution entity 106 validates the configuration upon receipt. Such validation may include verifying that appropriate and authorized components are being utilized in displaying entity 108.

When each component (e.g., projector 168A–168N or gigabit switch 172) is brought into service as part of a displaying entity 108, a system integrity validation method 176 may be utilized. Such a validation method may be executed by processor 170. The integrity validation 176 queries every member component in the displaying entity 108 of its permanent identification and verifies that each permanent identification is included in its member component database.

A software agent 178A–N and 180 on each component receives the query from the integrity validation 176 and responds to the query with the appropriate information. Accordingly, each key component (e.g., projectors 168A–N and gigabit switch 180) contains a software agent (e.g., 178A–N and 180 respectively) to monitor the integrity of the key components.

If the integrity validation 176 finds a new identification that is not in its member component database, an error message will be communicated to the distribution entity 106. The error message may include the original member component database and the new identification of the member component that was detected but not part of the original member component database. The member component database is not updated to include this newly detected permanent identification until it is validated by the distribution entity 106.

If the integrity validation 176 detects a new member component type that is not in its member component database, an immediate alarm may be raised. Such an alarm may include an error message indicating the Internet Protocol (IP) address of the illegal component. Further, the alarm may be displayed on a display of display entity 108. In addition, an error message may be communicated to the distribution entity 106 display. This error message may include the original member component database and the IP address of the illegal component. Upon receipt of such an alarm, the distribution entity 106 operator may contact an affected display entity 108/theater administrator to validate the alarm (e.g., investigate the possibility of theft or maintenance action).

Once the integrity of the display entity 108 has been validated, output media content 128 may be processed for display. Final decryption techniques ate used on the output media content 128 to substantially reproduce the original media content 110 in a viewable form which is provided to one or more of the displaying systems 168A–168N. Accordingly, displaying entity 108 may also include decryption units, decompression units, and/or smart card readers to assist in displaying media content 110. For example, encryption 126 and compression 124 applied by the preparation processor 118 is finally removed, however, any latent modification, undetectable to viewers (e.g., watermarking 122) is left intact. In one or more embodiments, a display processor 170 prevents storage of the decrypted media content in any media, whether in the storage device 166 or otherwise. In addition, the media content 110 can be communicated to the displaying systems 168A–168N over independently encrypted connections and/or high-speed wide area or local area networks, such as through gigabit switch 172 and gigabit Ethernet 174.

FIG. 2 is a functional block diagram of a computer system 200 that can be used to perform the operations of the media preparation processor 116 and processing system 164. Embodiments of the invention are typically implemented using a computer 200, which generally includes, inter alia, a display device 202, data storage devices 204, cursor control devices 206, and other devices. Those skilled in the art will recognize that any combination of the above components, or any number of different components, peripherals, and other devices, may be used with the computer 100.

Programs executing on the computer 200 (such as an operating system) are comprised of instructions which, when read and executed by the computer 200, causes the computer 200 to perform the steps necessary to implement and/or use the present invention. Computer programs and/or operating instructions may also be tangibly embodied in a memory and/or data communications devices of the computer, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Configuration Integrity Validation Logic of the Invention

As described above, one or more embodiments of the invention involves the key components of a display entity/exhibitor system 108. These key components may be composed of a single or multiple satellite receivers, high speed wide area networks, file servers, decryption units, decompression units, gigabit local area networks, smart card readers, and digital projectors. Each key component may be identified by a data item comprised of a unique permanent identification of the component itself. Additionally, each key component comprises a software agent (e.g., software agents 179A–N and 180) that is used to monitor the integrity of the exhibitor system 108. These features are utilized to validate the configuration integrity.

Figure 3:
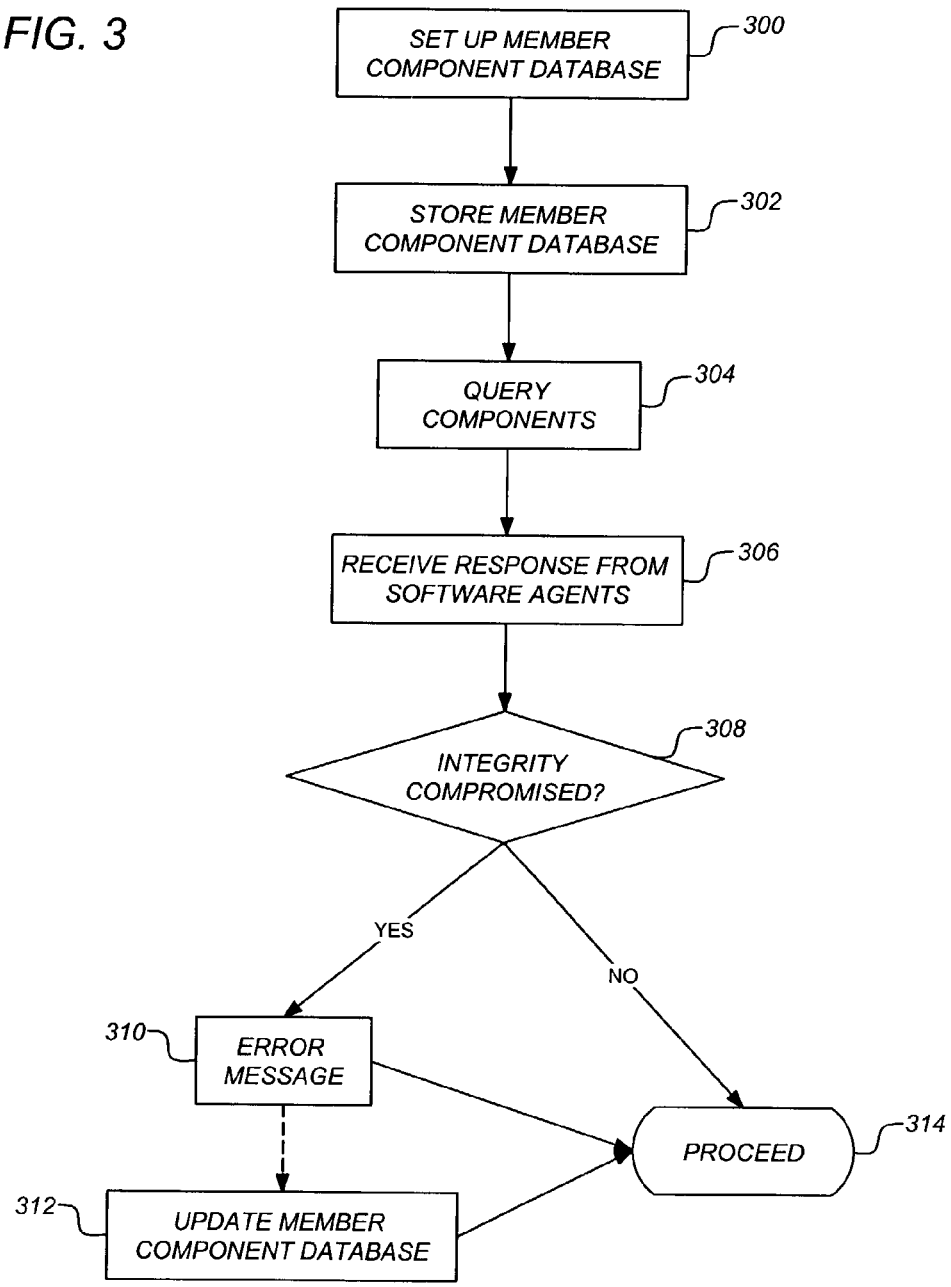
FIG. 3 is a flow chart illustrating the configuration integrity validation logic in accordance with one or more embodiments of the invention.

FIG. 3 is a flow chart illustrating the configuration integrity validation logic in accordance with one or more embodiments of the invention. At step 300, a member component database is set up. Step 300 may be performed during the configuration of the exhibitor system 108. The member component database contains the permanent identification of each member component including spare components.

At step 302, the member component database is stored (e.g., in nonvolatile memory) at the local exhibitor 108. A copy of the database may also be sent to the master database 144 at the NOC 106 for storage and use. Such a copy may be sent during the configuration, each time the database is modified, and/or each time a component is brought into service as part of an exhibitor system 108.

At step 304, each of the components in an exhibitor system 108 are queried (e.g., by integrity validation 176). At step 306, responses are received from software agents (e.g., software agents 178A–N and 180) of each of the queried components.

At step 308, a determination is made regarding whether the integrity of the exhibitor system 108 has been compromised. Such a determination may include verifying that all permanent identifications are included in the local member component database. Examples of when the integrity has been compromised includes a missing permanent identification (i.e., an identification from a component identified in the member component database is not received) and/or a new identification (i.e., a new identification is received that is not in the member component database).

At step 310, if a determination has been made that the integrity has been compromised, an error message is generated at step 310. Step 310 may also include communicating the error message to the NOC 106. For example, if a new component is detected, an alarm/error is raised and may be displayed on a display of the exhibitor system 108 and may be communicated and displayed on a display of the NOC 106. Further, the member component database on exhibitor system 108 may not be updated at step 312 until the new component has been validated by the NOC 106. After processing the error message (and/or validating the new component) processing continues at step 314.

Such processing may shut down the exhibitor system 108 until an administrator has investigated and/or cleared the error. Alternatively, if the integrity has not been compromised, the further display of output media content 128 may continue as described above. Thus, the invention provides a status message from the exhibitor system 108 to the NOC 106 if an exhibitor system 108 key component was switched without authorization. The invention therefore eliminates the possibility that someone created a component that has the same input/output (I/o) capabilities of another but could also act as a recording device and plug/replace this device into the system and record the content illegally.

Thus, one or more embodiments of the invention ensure the configuration integrity of the display entity 108 and protect the content intellectual property use management. Further, if any unauthorized configuration change is made, a record of such activities may be made available (e.g., at a central repository [such as database 144] at the NOC 106). Such a record may then be used for a variety of applications such as to adjust the billing to the exhibitor. Accordingly, as described, the invention provides the means to automatically map the exhibitor system's 108 key component configurations and thus helps enforce the content owner's contractual agreements with the exhibitors with minimum human intervention. In this regard, the manual auditing of equipment may be replaced with the automated and accurate system described herein. As a result, the possibility of unauthorized use of high value equipment and unauthorized access to high value content is thereby reduced.

CONCLUSION

This concludes the description of the preferred embodiment of the invention. The following describes some alternative embodiments for accomplishing the present invention. Support for other multiple functions related to maintenance and inventories in a proactive manner may be provided. For example, when a piece of equipment is replaced with a new one, the system may automatically send the new identification for the equipment to the NOC for validation, which also serves to keep the inventory updated. This information is also useful to derive information related to new orders, mean time between failure (MTBF) data on each monitored equipment, etc. Further, the component integrity and monitoring system can be applied to several larger or smaller vertical markets with a need to protect high value electronics assets.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for monitoring components of a digital cinema system comprising:
    storing a configuration of a display entity of a digital cinema system, wherein the display entity comprises one or more components, wherein the one or more components comprise a satellite receiver, a network, a file server, a decryption unit, a decompression unit, and a smart card reader, and wherein the configuration comprises an identification and a placement or use management of the one or more components;
    querying each of the one or more components based on the configuration;
    receiving one or more responses to the query from one or more software agents on each of the one or more components;
    determining whether an integrity of the display entity has been compromised based on the configuration and responses received.

2. The method of claim 1, wherein each component comprises a unique permanent unalterable identification that is one-time programmed during manufacture of the component.

3. The method of claim 2, wherein each response comprises the identification of each component queried.

4. The method of claim 1, further comprising sending a copy of the configuration to a network operation center (NOC).

5. The method of claim 4, wherein the copy of the configuration is sent to the NOC each time the configuration is modified.

6. The method of claim 4, wherein the copy of the configuration is sent to the NOC each time the exhibitor system is turned on.

7. The method of claim 1 further comprising displaying an error message regarding the integrity of the display entity on a display of the display entity when it has been determined that the integrit.

8. The method of claim 1 further comprising transmitting an error message regarding the integrity of the display entity to a network operation center (NOC) when it has been determined that the integrity of the display entity has been compromised.

9. The method of claim 8, wherein the error message comprises the configuration and an identification for an inconsistent component detected during the determination.

10. The method of claim 9, further comprising delaying updating the configuration until a NOC response validating the inconsistent component is received from the NOC.

11. The method of claim 8, wherein the error message indicates an internet protocol (IP) address of an inconsistent component detected during the determination.

12. The method of claim 1, wherein a member component database comprising the configuration is set up during configuration of the display entity.

13. The method of claim 1, wherein strong authentication is required to control read/write access to the configuration.

14. The method of claim 1 wherein the integrity of the display entity is valid and not compromised if all of the responses are consistent with the configuration.

15. A system for monitoring components of a digital cinema system comprising:
a display entity of a digital cinema system comprising one or more components and a memory, wherein the one or more components comprise a satellite receiver, a network, a file server, a decryption unit, a decompression unit, and a smart card reader; and
a configuration of the display entity stored in the memory, wherein the configuration comprises an identification and a placement or use management of the one or more components;
wherein the display entity is configured to:
query each of the one or more components based on the configuration;
receive one or more responses to the query from one or more software agents on each of the one or more components;
determine whether an integrity of the display entity has been compromised based on the configuration and responses received.

16. The system of claim 15, wherein each component comprises a unique permanent unalterable identification that is one-time programmed during manufacture of the component.

17. The system of claim 16, wherein each response comprises the identification of each component queried.

18. The system of claim 15, wherein the exhibitor system is further configured to send a copy of the configuration to a network operation center (NOC).

19. The system of claim 18, wherein the copy of the configuration is sent to the NOC each time the configuration is modified.

20. The system of claim 18, wherein the copy of the configuration is sent to the NOC each time the display entity is turned on.

21. The system of claim 15, wherein the display entity further comprises a display, and wherein the display entity is further configured to display an error message regarding the integrity of the display entity on the display when it has been determined that the integrity of the display entity has been compromised.

22. The system of claim 15, wherein the display entity is further configured to transmit an error message regarding the integrity of the display entity to a network operation center (NOC) when it has been determined that the integrity of the display entity has been compromised.

23. The system of claim 22, wherein the error message comprises the configuration and an identification for an inconsistent component detected during the determination.

24. The system of claim 23, wherein the display entity is further configured to delay updating the configuration until a NOC response validating the inconsistent component is received from the NOC.

25. The system of claim 22, wherein the error message indicates an internet protocol (IP) address of an inconsistent component detected during the determination.

26. The system of claim 15, wherein the display entity further comprises a member component database that stores the configuration and is set up during configuration of the display entity.

27. The system of claim 15, wherein strong authentication is required to control read/write access to the configuration.

28. The system of claim 15 wherein the integrity of the display entity is valid and not compromised if all of the responses are consistent with the configuration.

* * * * *